3,067,050
ALUMINA REFRACTORIES
Eldon D. Miller, Jr., Bethel Park, Pa., assignor to Harbison-Walker Refractories Company, Pittsburgh, Pa., a corporation of Pennsylvania
No Drawing. Filed Oct. 22, 1959, Ser. No. 847,865
14 Claims. (Cl. 106—65)

This invention relates to refractories of high alumina content by which is meant, for the purposes of this invention, refractories containing at least about 50 percent of $Al_2O_3$ by analysis.

High alumina refractories are generally classified by their $Al_2O_3$ content in groups having, approximately, 50, 60, 70, 80, 90, or 99 percent $Al_2O_3$ by analysis. Those containing 50 to 90 percent of $Al_2O_3$ are made by blending various high alumina refractory materials, while those of 99 percent content are made from high purity alumina. The common high alumina refractory materials and their typical $Al_2O_3$ contents are calcined alumina, 99 percent; calcined South American bauxite, 88 percent; calcined Alabama bauxite, 74 percent; calcined diaspore, 76 percent; burley diaspore, 48 and 58 percent; and kyanite, 56 percent. All of these materials are chemically compatible and accordingly they can be blended to provide almost any desired resultant alumina content. Further adjustment is sometimes accomplished by including minor amounts of clay or silica.

Refractory brick of such compositions are usually made by the power press, impact, or extrusion processes. In the power press process the raw materials are ground, screened to the desired sizes, blended and thoroughly mixed with a small but controlled amount of water. The moistened batch is then fed to a press in which the brick are formed under high pressure following which they are dried and then fired to develop the desired properties.

Impact pressing involves the use of a vibration press or ram with similar batches.

In the extrusion process the batch tempered with water is extruded through a die in the form of a dense column which is cut by wires into brick that are re-pressed to give them sharp corners and edges and smooth surfaces.

Batches of this type are also shaped by ramming or gunning them under pressure at the place where they are to serve and where they are fired in place.

It is among the objects of this invention to provide high alumina refractories which, as compared with those previously available, are of increased strength, increased abrasion resistance, higher density, lower porosity, lower permeability, and higher refractoriness, and which may be produced from the customary high alumina materials by practices standard in the refractory trade.

Another object is to provide batches for making refractories in accordance with the foregoing object.

Still another object is to provide a method of making refractories in accordance with the first-named object that is simple and readily practiced with standard apparatus used in the manufacture of refractories.

The invention is predicated upon my discovery that high alumina refractories of character superior to those presently available are produced by the addition of, by weight, at least 1 percent to not over 10 percent by weight of finely divided amorphous silica to a batch of the desired alumina content.

One form of amorphous silica that gives excellent results in the practice of the invention is volatilized silica, i.e., silica which has been deposited from a vapor phase. A typical silica of this type results from the reduction of silica to form silicon alloys, such as ferrosilicon. A similar silica fume can also be produced by reducing quartz with carbon or other suitable reducing agent, treating the vaporous products of the reduction with an oxygen yielding gas, and condensing the silica in finely divided form. The amorphous silicas used in the practice of this invention are substantially all finer than 50 microns, and more than half is finer than 10 microns. Such a silica analyzes at least 90 percent $SiO_2$ and normally runs about 95 percent, with between 2 and 3 percent of total FeO, MgO and $Al_2O_3$, and about 2 percent ignition loss.

In the practice of the invention batches are prepared in the general manner alluded to above. That is, the high alumina materials are ground, screened and blended to give the desired alumina content with the remainder consisting essentially of the other natural constituents of the ores used. The exact screen sizing to be used is dependent upon such factors as the raw materials used and the purpose to which the refractory is to be put but this is a matter well within the knowledge and skill of of those familiar with the refractory field. There is blended into the batch amorphous silica in an amount from at least about 1 percent up to not over 10 percent by weight of the batch. There may be added to the batch a temporary binder, of which a wide variety are known and used in the manufacture of refractory bricks, and the batch is tempered with water and then pressed following which the shapes are dried and then fired.

In the following examples, the standard power press method of making high alumina brick was employed. The components were crushed and thoroughly blended together to give a typical brickmaking grind, such as is noted below:

| | Percent |
|---|---|
| −3+10 mesh | 18 |
| −10+28 mesh | 30 |
| −28+65 mesh | 12 |
| −65 mesh | 40 |

About 4 to 6 percent by weight of water was added as was about 2 percent of waste sulfite liquor as a temporary binder. The 2 percent sulfite waste liquor used in the examples represents a common industry practice of adding a small amount of one of a variety of cold bonding agents so that the brick can more readily be handled with minimum breakage during manufacture. The mix was then pressed into brick, 9 x 4½ x 2½ inches, at about 4000 p.s.i. The shapes were removed from the press and ovendried at about 230° F. overnight. The brick were then fired for 10 hours at about 2730° F.

TABLE I.—COMPOSITIONS ANALYZING ABOUT 50% $Al_2O_3$

| | A | B | C | D | E | F |
|---|---|---|---|---|---|---|
| Calcined burley diaspore, percent | 85 | 84 | 82 | 80 | 78 | 75 |
| Calcined alumina | 15 | 15 | 15 | 15 | 15 | 15 |
| Volatilized silica | 0 | 1 | 3 | 5 | 7 | 10 |
| Bulk density, lb./cu. ft. | 141 | 142 | 146 | 152 | 152 | 145 |
| Modulus of rupture, p.s.i. | 2,050 | 2,210 | 2,400 | 2,660 | 2,170 | 1,270 |
| Apparent porosity, percent | 18.9 | 18.1 | 14.4 | 10.8 | 10.6 | 15.0 |
| Linear change in burning, percent | −1.9 | −1.0 | −1.1 | −1.1 | −0.9 | −0.9 |
| Reheat at 3,140° F.: Volume change, percent | −4.8 | −4.3 | −2.2 | +6.1 | +4.6 | +2.3 |
| Spalling loss, percent | 41.7 | 32.5 | 37.6 | 35.8 | 11.6 | 3.2 |

Composition A is representative of a 50 percent $Al_2O_3$ refractory brick of the type available heretofore. Comparison of its properties with those of compositions B to F shows clearly that with 1 percent of volatilized silica there was improvement in all of the properties, that there was found a substantial improvement in the mix containing 3 percent of volatilized silica, and still further marked improvement in the mixes with 5 and 7 percent addition. Composition F, containing 10 percent of volatilized silica was much better than composition A as to most properties although it will be observed that the maximum improvement had been passed.

Customarily in high alumina brick of the 50 percent $Al_2O_3$ class it is found that they shrink appreciably at high temperatures in various service applications. One aim of refractories technology is to minimize this shrinkage to prevent the opening up of joints and the consequent entrance of damaging materials such as molten metal, slag, and fume. One wholly unexpected result of this inclusion of amorphous silica in high alumina refractories was the reheat expansion. The data of Table I show that as the additions of the volatilized silica were made to the base mix (composition A, which shrunk 4.8 percent in volume at 3140° F.) there was a progressive decrease in shrinkage. With mix C, containing 3 percent of the silica addition, the volume change was reduced to less than half that of the base mix, and at higher percentages of volatilized silica there was an overall volume expansion at 3140° F. This expansion effect, which in service actually tends to close up the joints between bricks, reached its maximum with 5 and 7 percent additions of volatilized silica.

Particularly valuable is the attainment of porosities of 15 percent and under which were achieved with additions of volatilized silica above 1 percent. The values of 10.6 and 10.8 porosity obtained with compositions E and D, respectively, are recognized as previously unattainable with high alumina brick of graded size compositions fired short of advanced fusion.

The attainment of high density and low porosity in the refractories of this invention does not depend upon obtaining an increased shrinkage in firing, which is always accompanied with distortion tendencies and other problems. To illustrate, composition E with 7 percent of volatilized silica showed essentially the same firing shrinkage as composition B. All of the compositions of Table I showed slight linear shrinkage in firing. This property of low shrinkage when subjected to high firing will indicate to refractories technicians that these same compositions can to advantage be used for the manufacture of so-called chemically bonded brick. Thus, merely by increasing the sulfite waste liquor to 3 to 8 percent they are given enough strength to allow shipment without prior firing.

The fact that these compositions achieve high density without the aid of high firing has led to their use also for shaped refractories of other than brick form. This has reference to refractories sold for placement by gunning or ramming. Mix C of Table I serves excellently as such a monolithic refractory.

TABLE II.—COMPOSITIONS ANALYZING ABOUT 72% ALUMINA

| | | |
|---|---|---|
| Calcined Alabama bauxite, percent | 65 | 65 |
| Calcined alumina, percent | 26.5 | 26.5 |
| Potter's flint, percent | 8.5 | 5.5 |
| Volatilized silica, percent | 0 | 3.0 |
| Bulk density, lb./cu. ft. | 147 | 150 |
| Modulus of rupture, p.s.i. | 1,360 | 1,520 |
| Apparent porosity, percent | 22.4 | 20.8 |
| Reheat at 2,910° F.: Volume change, percent | −2.3 | −2.3 |

Typically, the properties of 72 percent $Al_2O_3$ brick are in an altogether different range than those of 50 percent $Al_2O_3$ refractories. For example, higher porosity is to be expected. Nevertheless, within its frame of reference the above example shows that the 3 percent addition of volatilized silica produced effective improvements.

TABLE III.—COMPOSITIONS ANALYZING ABOUT 85% ALUMINA

| | | |
|---|---|---|
| Calcined South American bauxite, percent | 80 | 82 |
| Calcined alumina, percent | 15 | 15 |
| Kentucky ball clay, percent | 5 | |
| Volatilized silica, percent | 0 | 3 |
| Bulk density, lb./cu. ft. | 180 | 184 |
| Modulus of rupture, p.s.i. | 1,670 | 2,660 |
| Apparent porosity, percent | 19.4 | 15.8 |
| Reheat at 2,910° F.: Volume change, percent | −0.9 | 0.0 |

Here, again, greatly increased strength, improved density and lower porosity resulted from the silica addition.

Further important aspects of this invention, and particularly its application to alumina compositions of high purity are demonstrated by Table IV.

TABLE IV.—90% ALUMINA COMPOSITIONS

| | M | N | O | P | Q | R | S |
|---|---|---|---|---|---|---|---|
| Tabular alumina, percent | 85 | 90 | 90 | 90 | 90 | 90 | 90 |
| Kentucky ball clay, percent | 15 | | | | | | |
| Potter's flint, percent | | 10 | 9 | 7 | 5 | 3 | |
| Volatilized silica, percent | 0 | 0 | 1 | 3 | 5 | 7 | 10 |
| Density, lb./cu. ft. | 172 | 172 | 173 | 179 | 185 | 187 | 179 |
| Modulus of rupture, p.s.i. | 930 | 1,550 | 1,800 | 4,170 | 4,100 | 2,710 | 1,140 |
| Apparent porosity, percent | 21.1 | 22.3 | 21.7 | 15.5 | 13.2 | 13.6 | 16.5 |
| Linear change in burning, percent | +0.9 | −0.1 | −0.2 | −0.2 | −0.1 | −0.2 | −0.2 |
| Reheat at 3,140° F.: Volume change, percent | −3.3 | +2.3 | +2.3 | +2.1 | +1.4 | +1.7 | +1.9 |
| Abrasion loss [1] | 4.84 | | | 2.35 | 0.97 | | |
| Permeability | | .550 | .894 | .192 | .182 | .281 | 1.704 |

[1] Cc. abraded after 4 min. sand blast.

The permeability values given in Table IV are in terms of cubic inches of air per second per square inch of area per inch of thickness per pound of pressure.

The compositions of Table IV showed no loss when subjected to the ASTM spalling test although some cracking was observed. This ranged from 6 pronounced cracks in the base mix (composition M) with no added amorphous silica to 2 hairline cracks in composition S.

These compositions which would analyze about 90 percent $Al_2O_3$ were made primarily from a densely sintered high purity alumina grain. Refractories of this class are important commercially and are used in industrial furnaces of many types. Commonly they are compounded, as in example M, by adding enough clay, e.g. 10–20%, to bond them, that is, to give high strength to the fired product. A modulus of rupture of 930 p.s.i. has been considered to represent good strength for this class of product.

The fact that porosity is typically in excess of 20 percent has been a seriously limiting factor in the use of these refractories.

It will be noted, by comparing composition N with M that when the 15 percent ball clay was replaced by 10 percent of finely ground crystalline silica (potter's flint) certain properties were changed advantageously, but these did not include an increase in density or porosity reduction. However, the volatilized silica of compositions O to S had a positive effect on both of these properties as well as on strength (modulus of rupture).

In many respects it appears that this invention is ideally suited to compositions of essentially 90 percent alumina content. Thus, as far as I know, no other commercial 90 percent alumina refractory brick of high purity, made by processes short of fusion, exhibits strength as high as the 4000 p.s.i. modulus of rupture of compositions P and Q which contained 3 and 5 percent volatilized silica, respectively. This unique property, taken in conjunction with the equally remarkable porosities of 15 percent or less of compositions P, Q and R makes it possible to apply these new refractories to many services for which high alumina brick would not ordinarily be chosen.

It is basic to the science of alumina-silica refractories that as alumina content (by chemical analysis) is increased above the 46 percent $Al_2O_3$ maximum for clay refractories, the refractoriness or melting point increases.

Thus, if a furnace operator finds it necessary to increase his furnace temperature to the point where fireclay brick are inadequate, he ordinarily calls upon brick of 50%, 60%, 70%, 80%, 90%, and higher alumina content, as dictated by his furnace temperatures. Unfortunately, high temperature is only one of the service factors which cause the failure of refractories. Many of the others, such as, attack by slag, penetration of destructive gases, and abrasion by charge materials or dust, are directly related to porosity, and in the high alumina series of brick, porosity has generally increased directly with alumina content. This has prevented the free substitution of high alumina for fireclay brick which on the basis of resistance to high temperatures alone would be desirable. It is this limitation that the present invention so largely removes. The data show that porosities of less than 15 percent are attainable in high alumina refractories of many types by the use of this invention. Table IV indicates that with refractories having a 90% percent $Al_2O_3$ content, as with the 50 percent $Al_2O_3$ brick of Table I, the use of 1 percent volatilized silica does not give a marked improvement and 10 percent volatilized silica in some respects is obviously excessive. These examples are thus useful in establishing a recommended range. In other words, in the practice of the invention there is used more than 1 percent and less than 10 percent amorphous, or volatilized, silica by weight. Three percent to 7 percent give very worthwhile results.

In the examples of Table IV, the crystalline silica or potter's flint is not an essential constituent. It was merely used to adjust the alumina content to 90 percent. Experience has shown that this invention would be equally effective in the complete absence of any added silica in addition to the volatilized silica.

Included among the high alumina materials which are satisfactory are materials which have been previously fused. Such fused grain is crushed and otherwise broken down into the various grain sizes needed for our refractories. Common types of electrically fused high alumina grain are referred to as fused alumina, fused mullite, fused bauxite, etc., and will generally range in $Al_2O_3$ content from 60 percent 99 percent.

The 90% alumina compositions utilizing my invention may contain ingredients other than those of Table IV. Similar compositions using 5% to 25% of silicon carbide or zircon, or small amounts of each, also show striking benefits from the use of 1% to 10% of amorphous silica.

The chemical analyses of the materials used in making the foregoing compositions were as follows:

| Calcined and tabular alumina | Calcined burley diaspore | Calcined Alabama bauxite |
|---|---|---|
| 99.4% $Al_2O_3$. | 48.0% $SiO_2$. | 21.9% $SiO_2$. |
| 0.3% $SiO_2$. | 47.1% $Al_2O_3$. | 74.2% $Al_2O_3$. |
| 0.2% $Fe_2O_3$. | 2.4% $TiO_2$. | 3.4% $TiO_2$. |
| 0.1% alkaline earth oxides. | 1.1% $Fe_2O_3$. | 0.8% $Fe_2O_3$. |
| | 0.40% MgO. | 0.04% CaO. |
| | 0.24% CaO. | 0.05% MgO. |
| | 0.56% alkalies. | 0.02% alkalies. |

| Potter's flint | Calcined South American bauxite | Ball clay |
|---|---|---|
| 99.7% $SiO_2$. | 88.58% $Al_2O_3$. | 30.3% $Al_2O_3$. |
| 0.3% $Al_2O_3+Fe_2O_3+TiO_2$. | 6.21% $SiO_2$. | 53.6% $SiO_2$. |
| | 3.37% $TiO_2$. | 1.7% $TiO_2$. |
| | 1.56% $Fe_2O_3$. | 0.9% $Fe_2O_3$. |
| | | 0.49% CaO+MgO. |
| | | 0.41% $Na_2O+K_2O+Li_2O$. |
| | | 12.4% ignition loss. |

It should be obvious from the foregoing chemical analysis of the materials used, and the percent makeup of mixes according to this invention as set forth in Tables I, II, III and IV above, that the total $Fe_2O_3$ inclusions in the mixes are as follows:

Table I
[Percent]

| Mix | A | B | C | D | E | F |
|---|---|---|---|---|---|---|
| Calcined burley diaspore | 85 | 84 | 82 | 80 | 78 | 75 |
| Calcined alumina | 15 | 15 | 15 | 15 | 15 | 15 |
| $Fe_2O_3$ from CB diaspore* | 0.935 | 0.924 | 0.902 | 0.880 | 0.858 | 0.825 |
| $Fe_2O_3$ from calcined $Al_2O_3$* | 0.030 | 0.030 | 0.030 | 0.030 | 0.030 | 0.030 |
| Total $Fe_2O_3$* | 0.965 | 0.954 | 0.932 | 0.910 | 0.888 | 0.855 |

Table II
[Percent]

| Mix | A | B |
|---|---|---|
| Calcined Alabama bauxite | 65 | 65 |
| Calcined alumina | 26.5 | 26.5 |
| Potter's flint | 8.5 | 5.5 |
| $Fe_2O_3$ from calcined Alabama bauxit* | 0.520 | 0.520 |
| $Fe_2O_3$ from calcined $Al_2O_3$* | 0.050 | 0.050 |
| $Fe_2O_3$ from potter's flint* | 0.009 | 0.006 |
| Total $Fe_2O_3$* | 0.579% | 0.576% |

Table III
[Percent]

| Mix | A | B |
|---|---|---|
| Calcined S.A. bauxite | 80 | 82 |
| Calcined alumina | 15 | 15 |
| Kentucky ball clay | 5 | |
| $Fe_2O_3$ from calcined S.A. bauxite* | 1.248 | 1.279 |
| $Fe_2O_3$ from calcined $Al_2O_3$* | 0.030 | 0.030 |
| $Fe_2O_3$ from Kentucky ball clay* | 0.045 | |
| Total $Fe_2O_3$* | 1.323 | 1.309 |

Table IV
[Percent]

| Mix | M | N | O | P | Q | R | S |
|---|---|---|---|---|---|---|---|
| Tabular alumina | 85 | 90 | 90 | 90 | 90 | 90 | 90 |
| Kentucky ball clay | 15 | | | | | | |
| Potter's flint | | 10 | 9 | 7 | 5 | 3 | |
| $Fe_2O_3$ from tabular $Al_2O_3$* | 0.17 | 0.18 | 0.18 | 0.18 | 0.18 | 0.18 | 0.18 |
| $Fe_2O_3$ from Kentucky ball clay* | 0.14 | | | | | | |
| $Fe_2O_3$ from Potter's flint* | | 0.01 | 0.01 | 0.01 | 0.01 | 0.00 | |
| Total $Fe_2O_3$* | 0.31 | 0.19 | 0.19 | 0.19 | 0.19 | 0.18 | 0.18 |

*A sample calculation used to obtain the figures in the above is as follows:
The calcined burned diaspore, in Table I, Mix A=85% of the total mix and has 1.1% $Fe_2O_3$ giving .85 x 1.1 or 0.935% $Fe_2O_3$ contributed to the total mix.
Calcined alumina, in Table I, Mix A=15% of the total mix and has 0.2% $Fe_2O_3$ giving .15 x 0.2 or 0.030% $Fe_2O_3$ contributed to the total mix. Therefore, 0.935+0.030 or 0.965 is the total % iron oxide in the total mix.

It should be noted that the greatest inclusion of iron oxide is the mix of Table III, Mix A, showing less than about 1.3% iron oxide.

According to the provisions of the patent statutes, I have explained the principle of my invention and have described what I consider to represent its best embodiment. However, I desire to have it understood that, within the scope of the appended claims, the invention may be practiced otherwise than as specifically described.

I claim:

1. That method of making a high alumina refractory body comprising, providing a pressable batch mixture consisting essentially of, by weight, from at least 1 percent to not over 10 percent of substantially pure volatilized silica, and the remainder being alumina refractory material, subdivided to range in graded particle sizes of from about −3 to +10 mesh to −65 mesh, having less than about 1.3 percent, by weight, of iron oxide, and selected from the group consisting of alumina, aluminum ores and mixtures thereof containing at least about 50 percent of $Al_2O_3$, by analysis, whereby the batch contains at least about 50 percent of $Al_2O_3$, by analysis, supplied by said refractory material, and forming the batch under pressure to form a self-sustaining body, firing said body for a length of time sufficient to induce formation of a very fine crystalline mullite binding between the coarse ground particles of refractory material, and in which said mullite binding material is substantially all characterized by very fine crystals having small and dispersed voids whereby a coarse textured yet dense and highly impermeable body is obtained.

2. A method according to claim 1, said batch containing also a minor proportion by weight of a temporary binder.

3. A method according to claim 1, said batch containing about 90 percent of $Al_2O_3$ by analysis.

4. A method according to claim 1, substantially all of said silica being finer than 50 microns and at least half being finer than 10 microns.

5. A fired high alumina refractory body prepared from a mix consisting essentially of, by weight, from at least 1 percent to not over 10 percent of substantially pure volatilized silica, and the remainder of a coarse ground alumina refractory material, having less than about 1.3 percent, by weight, of iron oxide, and selected from the group consisting of alumina, aluminum ores and mixtures thereof containing at least about 50 percent of $Al_2O_3$, by analysis, whereby the mix contains at least about 50 percent of $Al_2O_3$ by analysis supplied by said refractory material, said silica being substantially all in the form of a fine crystalline mullite binding between the particles of refractory material and in which said mullite appears in the form of a mass of sub-micron size crystals having very small and highly dispersed voids whereby a coarse textured yet dense and highly impermeable body is obtained.

6. A batch for making high alumina refractory consisting essentially of, by weight, from at least 1 percent to not over 10 percent of substantially pure volatilized silica, and the remainder being alumina refractory material subdivided to range in graded particle sizes from about −3 to +10 to −65 mesh, having less than about 1.3 percent, by weight, of iron oxide, and selected from the group consisting of alumina, aluminum ores and mixtures thereof containing at least about 50 percent of $Al_2O_3$, by analysis, whereby the batch contains at least about 50 percent of $Al_2O_3$, by analysis, supplied by said refractory material, said batch capable of being formed under pressure to a self-sustaining body and upon firing to exhibit a very fine micron size crystalline mullite binding between the particles having very small and highly dispersed voids whereby a coarse textured yet dense and highly impermeable body is obtained.

7. A refractory according to claim 5 containing about 90 percent of $Al_2O_3$ by analysis.

8. A batch according to claim 6 in which the $Al_2O_3$ is about 90 percent by analysis.

9. A batch according to claim 6, substantially all of said silica being finer than 50 microns and at least half being finer than 10 microns.

10. A batch according to claim 6 containing also a temporary binder.

11. A fired high alumina refractory body prepared from a mix consisting essentially of, by weight, from at least 1 percent to not over 10 percent of substantially pure volatilized silica, the remainder being a coarse ground alumina refractory material, having less than about 1.30 percent, by weight, of iron oxide, and selected from the group consisting of alumina, aluminum ores and mixtures thereof containing at least about 50 percent of $Al_2O_3$, by analysis, and sufficient crystalline silica to maintain the $Al_2O_3$ analysis of the total mix between about 50 percent and about 90 percent of $Al_2O_3$, by analysis, supplied by said refractory material, said volatilized silica, upon firing, being substantially all in the form of a fine crystalline mullite binding between the particles of refractory material and in which said mullite appears in the form of a mass of sub-micron size crystals having very small and highly dispersed voids whereby a coarse textured yet dense and highly impermeable body is obtained.

12. A refractory according to claim 11 in which the crystalline silica is potter's flint.

13. The refractory of claim 11 in which the mix consists of essentially, all parts by weight, about 90 percent tabular alumina, about 5 percent potter's flint, and about 5 percent volatilized silica.

14. The refractory of claim 11 in which the alumina refractory material is selected from the group consisting essentially of calcined alumina, calcined South American bauxite, calcined Alabama bauxite, calcined diaspore, burley diaspore, kyanite, and mixtures thereof.

References Cited in the file of this patent
UNITED STATES PATENTS

| | | |
|---|---|---|
| 2,339,454 | Bradley | Jan. 18, 1944 |
| 2,428,178 | Reik et al. | Sept. 30, 1947 |
| 2,672,671 | Robinson | Mar. 23, 1954 |
| 2,695,849 | McMullen | Nov. 30, 1954 |
| 2,899,323 | Venable | Aug. 11, 1959 |